(12) United States Patent
Gretz

(10) Patent No.: US 7,045,713 B1
(45) Date of Patent: May 16, 2006

(54) ELECTRICAL BOX AND BUSHING COMBINATION FOR PROVIDING ELECTRICAL SERVICE ON A BLOCK WALL

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/264,857

(22) Filed: Nov. 2, 2005

Related U.S. Application Data

(63) Continuation-in-part of application No. 11/246,985, filed on Oct. 7, 2005, which is a continuation-in-part of application No. 11/185,256, filed on Jul. 20, 2005, which is a continuation-in-part of application No. 11/120,707, filed on May 3, 2005, which is a continuation-in-part of application No. 11/102,392, filed on Apr. 8, 2005, which is a continuation-in-part of application No. 11/070,344, filed on Mar. 2, 2005, now Pat. No. 6,965,078, which is a continuation-in-part of application No. 11/009,116, filed on Dec. 10, 2004, now Pat. No. 7,005,578, which is a continuation-in-part of application No. 10/863,942, filed on Jun. 9, 2004, now Pat. No. 6,956,171.

(51) Int. Cl.
*H01H 9/02* (2006.01)

(52) U.S. Cl. .................. 174/58; 174/57; 174/50; 174/63; 248/906; 439/535

(58) Field of Classification Search .................. 174/48, 174/49, 50, 53, 57, 58, 65 R, 152 R, 152 G, 174/153 G, 151; 220/3.2, 3.3, 3.4, 3.5, 3.6, 220/3.7, 3.8, 4.02; 248/906, 343, 56, 74.1; 16/2.1, 2.2; 439/535, 536

See application file for complete search history.

(56) References Cited

U.S. PATENT DOCUMENTS

| 3,076,668 | A | * | 2/1963 | Famely .................. 248/56 |
| 3,620,404 | A | * | 11/1971 | Grasso .................. 174/48 |
| 3,983,598 | A | | 10/1976 | Rosan, Sr. et al. |
| 4,180,297 | A | * | 12/1979 | Abrams .................. 174/153 G |
| 4,842,155 | A | * | 6/1989 | Begin, Jr. .................. 220/3.6 |
| 4,988,832 | A | * | 1/1991 | Shotey .................. 174/53 |
| 5,213,290 | A | | 5/1993 | Moretti |
| 5,359,152 | A | * | 10/1994 | Hone-Lin .................. 174/53 |
| 6,013,875 | A | * | 1/2000 | Fridenberg et al. ........ 174/68.3 |
| 6,064,004 | A | | 5/2000 | Kunnas |
| 6,417,447 | B1 | * | 7/2002 | Bosse, Jr. .................. 174/48 |
| 6,547,589 | B1 | * | 4/2003 | Magyar et al. .............. 439/535 |
| 6,777,616 | B1 | | 8/2004 | Beele |
| 6,840,483 | B1 | | 1/2005 | Dickens |
| 6,878,877 | B1 | * | 4/2005 | Cozzi et al. .................. 174/53 |
| 6,894,222 | B1 | * | 5/2005 | Lalancette et al. ............ 174/58 |

* cited by examiner

*Primary Examiner*—Angel R. Estrada

(57) ABSTRACT

A combination of an electrical box and a bushing for providing electrical service on a block wall. A mounting arrangement is included on the electrical box for securing the box to a first surface of the block wall. A fastening arrangement is included on the bushing for securing the bushing to a second surface of the block wall. The electrical box includes sidewalls, a front opening, and a cavity for receiving an electrical device therein. The bushing includes a flange with a rear surface and a tube portion extending from the rear surface. An opening extends from the flange through the tube portion of the bushing. The electrical box and bushing combination provides electrical service to a block wall while minimizing the possibility of cable abrasion, electrical shorts, and the loss of power to the electrical box.

8 Claims, 5 Drawing Sheets

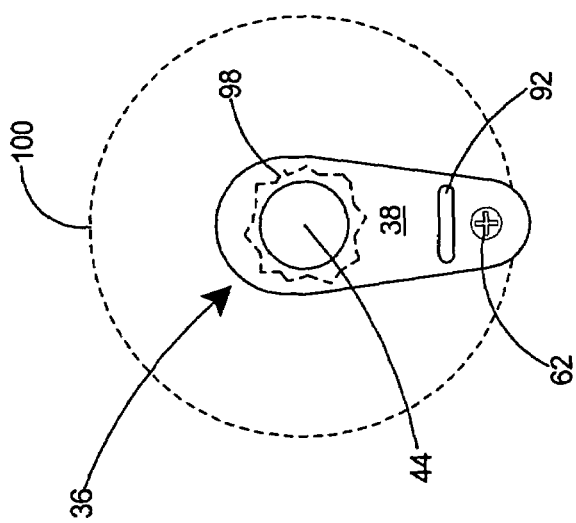
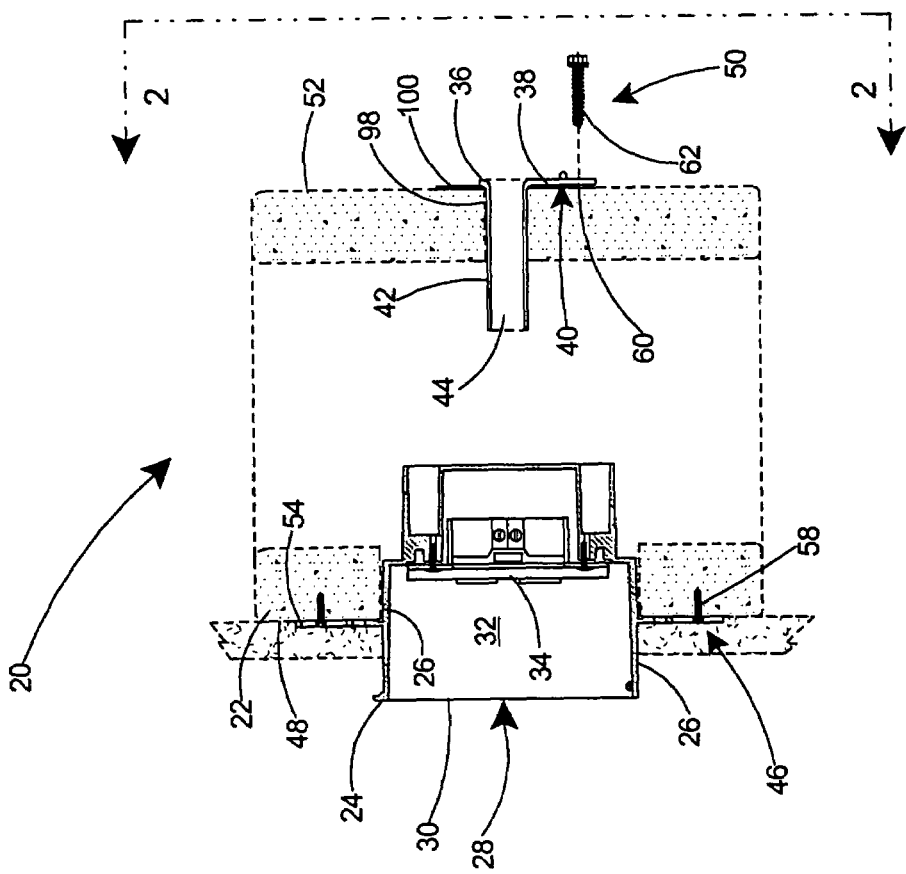

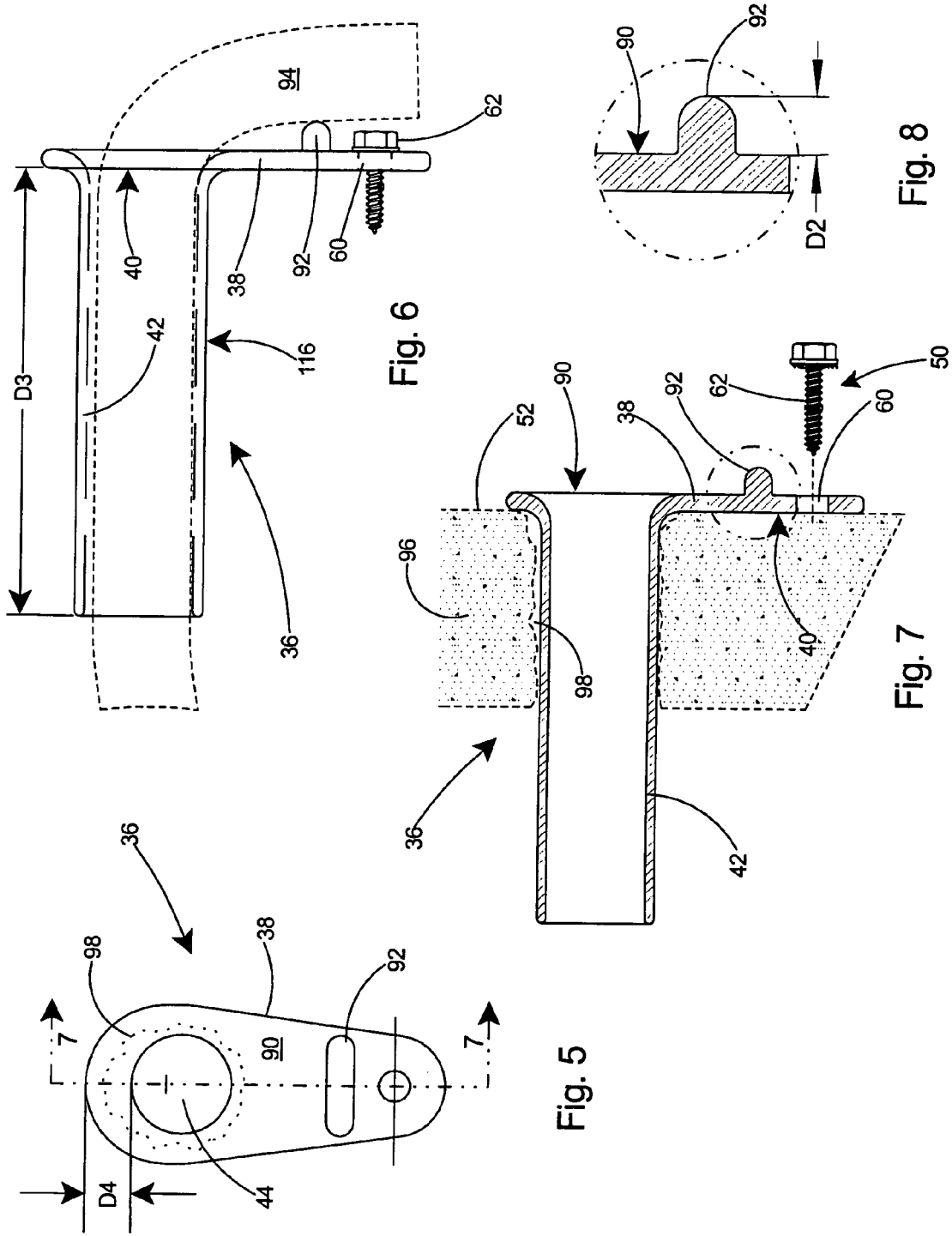

ELECTRICAL BOX AND BUSHING COMBINATION FOR PROVIDING ELECTRICAL SERVICE ON A BLOCK WALL

This application is a continuation-in-part of U.S. patent application Ser. No. 11/120,707 filed May 3, 2005, and is a Continuation-In-Part of U.S. patent application Ser. No. 11/246,985, filed Oct. 7, 2005, which is a Continuation-In-Part of U.S. patent application Ser. No. 11/185,256, filed Jul. 20, 2005, which is a Continuation-In-Part of U.S. patent application Ser. No. 11/102,392, filed Apr. 8, 2005, which is a Continuation-In-Part of U.S. patent application Ser. No. 11/070,344, filed Mar. 2, 2005 and now U.S. Pat. No. 6,965,078, which is a Continuation-In-Part of U.S. patent application Ser. No. 11/009,116 filed Dec. 10, 2004 and now U.S. Pat. No. 7,005,578, which is a Continuation-In-Part of U.S. patent application Ser. No. 10/863,942 filed Jun. 9, 2004 and now U.S. Pat. No. 6,956,171.

FIELD OF THE INVENTION

This invention relates to electrical boxes and specifically to a combination of an electrical box and a bushing that enables an installer to provide electrical service on a block wall.

BACKGROUND OF THE INVENTION

Mounting an electrical box on a block wall frequently requires the installer to form a hole in the opposite side of the wall in order to supply electricity to the newly installed box. Typically the installer uses a hammer, chisel and hammer, or similar tools to make a rough hole in the block and then feeds the electrical cable through the newly formed hole.

Although the aforementioned procedure provides an electrical supply to the electrical box, it is less than optimal as the outer sheath of the electrical cable is in contact with the rough walls edging the hole in the block. This contact between the electrical cable and the rough walls can lead to abrasion of the sheath of the electrical cable and can eventually lead to the cable being shorted out. The rate of abrasion can be particularly severe in those locations where the block wall is subject to considerable vibration, such as in manufacturing locations having rotating or reciprocating equipment mounted nearby.

Electrical boxes for installation on block walls were disclosed in U.S. Pat. No. 6,956,171 and in co-pending U.S. application Ser. Nos. 11/120,707, 11/246,985, 11/185,256, 11/102,392, 11/070,344, 11/009,116, and 10/863,942, all of which are commonly owned by the assignee of the present invention and the contents of which each are referred to herein and incorporated herein in this specification in their entirety. Although several of the electrical boxes disclosed in the aforementioned patents and applications were specifically for mounting on block walls, they did not disclose an improved device or method for feeding electrical cable to the electrical box described therein.

What is needed therefore is an improved device and method for supplying electrical cable an electrical box mounted on a concrete block wall, or similar block wall, that provides a safe electrical supply and minimizes cable abrasion and the chance of electrical shorts.

SUMMARY OF THE INVENTION

The invention is a combination of an electrical box and a bushing for providing electrical service on a block wall. A mounting arrangement is included on the electrical box for securing the box to a first surface of the block wall. A fastening arrangement is included on the bushing for securing the bushing to a second surface of the block wall. The electrical box includes sidewalls, a front opening, and a cavity for receiving an electrical device therein. The bushing includes a flange with a rear surface and a tube portion extending from the rear surface. An opening extends from the flange through the tube portion of the bushing. The electrical box and bushing combination provides electrical service to a block wall while minimizing the possibility of cable abrasion, electrical shorts, and the loss of power to the electrical box.

OBJECTS AND ADVANTAGES

The combination of the present invention provides reliable electrical service to a block wall. It has the advantage of greatly reducing cable abrasion, electrical shorts, and loss of power.

A further advantage provided by the combination of the present invention is that it may be simply installed by one person.

The combination of the present invention also enables an installer to easily and accurately position the electrical box at a desired offset from the wall's surface. This is of critical importance on those walls that will be covered with a finishing layer such as stucco.

These and other objects and advantages of the present invention will be better understood by reading the following description along with reference to the drawings.

DESCRIPTION OF THE DRAWINGS

FIG. 1 is a side conceptual view of a preferred embodiment of the combination of the present invention including an electrical box and a cable bushing with each installed on opposite walls of a block.

FIG. 2 is a front elevation view of the cable bushing portion of the combination of the present invention taken along line 2—2 of FIG. 1.

FIG. 5 is a front elevation view of a cable bushing according to the present invention.

FIG. 6 is a side view of the cable bushing of FIG. 5.

FIG. 7 is a sectional view of the cable bushing taken along line 7—7 of FIG. 5.

FIG. 8 is a detail view of a portion of the cable bushing of FIG. 5.

TABLE OF NOMENCLATURE

Figure 3:
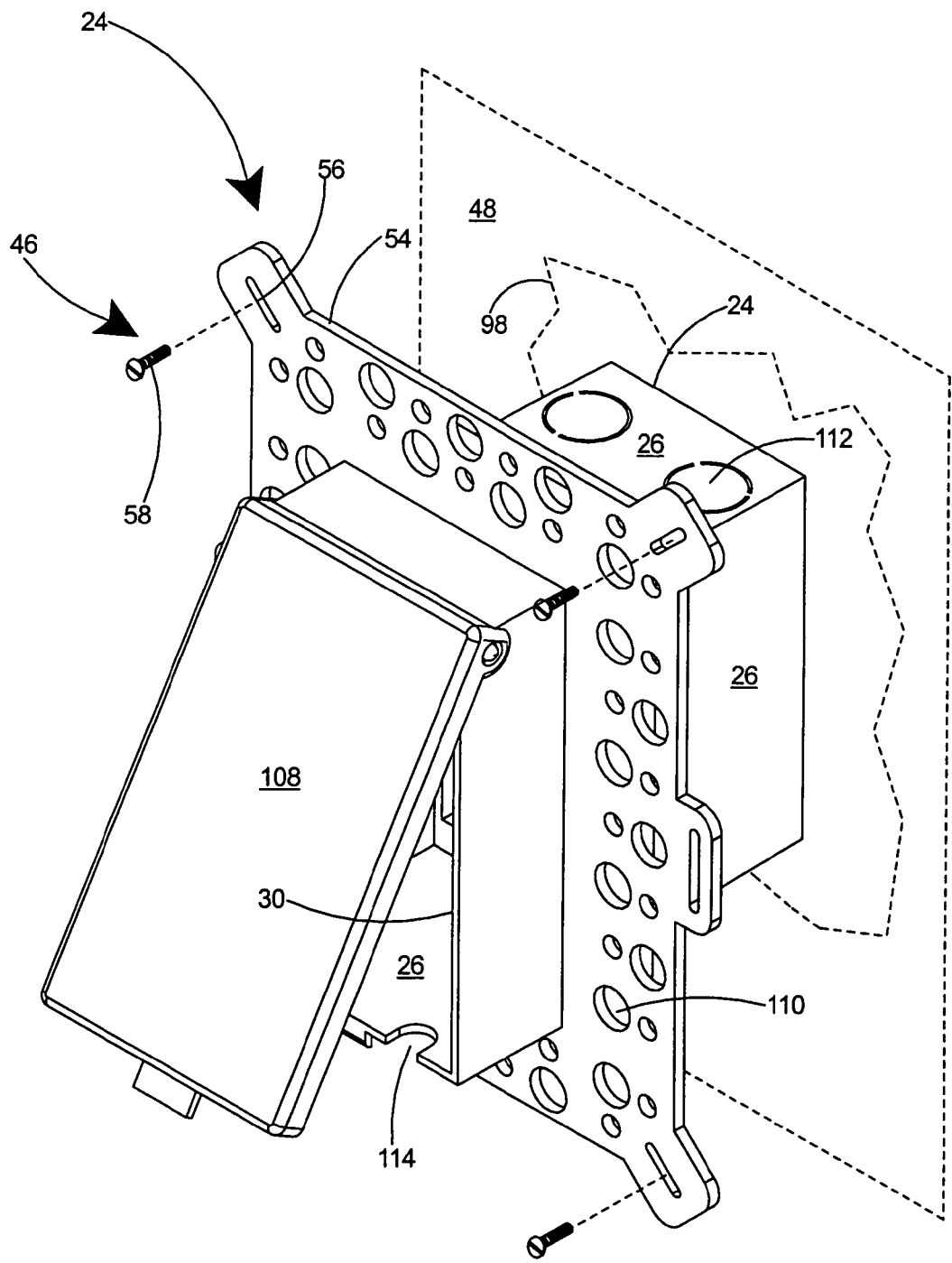
FIG. 3 is a perspective view of the electrical box portion of the combination of FIG. 1.

The following is a listing of part numbers used in the drawings along with a brief description:

| Part Number | Description |
| --- | --- |
| 20 | combination for providing electrical service |
| 22 | block wall |
| 24 | electrical box |
| 26 | sidewalls |
| 28 | front opening |
| 30 | front edge |
| 32 | cavity |
| 34 | electrical device |
| 36 | bushing |
| 38 | flange portion of bushing |
| 40 | rear surface of flange |
| 42 | tube portion of bushing |
| 44 | opening |
| 46 | mounting arrangement |
| 48 | first surface of block wall |
| 50 | fastening arrangement |
| 52 | second surface of block wall |
| 54 | peripheral flange of electrical box |
| 56 | aperture in peripheral flange |
| 58 | box fastener |
| 60 | aperture in flange |
| 62 | fastener |
| 70 | electrical box, second embodiment |
| 72 | mounting arrangement |
| 74 | slide member |
| 76 | peripheral flange of slide member |
| 78 | arms |
| 80 | first fastener |
| 82 | second fastener |
| 84 | first aperture in peripheral flange |
| 86 | second aperture in arm of slide member |
| 88 | aperture in sidewall of electrical box |
| 90 | front surface of bushing |
| 92 | integral tab |
| 94 | electrical cable |
| 96 | block |
| 98 | hole |
| 100 | washer |
| 102 | stucco layer |
| 104 | first hole |
| 106 | second hole |
| 108 | cover member |
| 110 | opening |
| 112 | removable section |
| 114 | U-shaped slot |
| 116 | outer surface of tubular portion |
| D1 | offset of front edge from wall surface |
| D2 | distance tab extends from front surface of flange |
| D3 | distance tube portion extends from rear surface |
| D4 | distance flange extends from opening |

DETAILED DESCRIPTION OF THE INVENTION

The present invention comprises a combination of an electrical box and a bushing for providing electrical service on a block wall. It is especially useful on walls constructed of blocks having walls formed by hollow cores within the block. These construction blocks are commonly termed concrete, cement, or masonry blocks.

With reference to FIGS. 1 and 2, the combination 20 for providing electrical service on a block wall 22 includes an electrical box 24 having sidewalls 26, a front opening 28, a front edge 30, and a cavity 32 for receiving an electrical device 34 therein. The combination 20 further includes a bushing 36. The bushing 36 includes a flange 38 having a rear surface 40, a tube portion 42 extending from the rear surface 40, and an opening 44 extending through the flange 38 and the tube portion 42. A mounting arrangement 46 is included on the electrical box 24 for securing the electrical box 24 to a first surface 48 of the block wall 22 and a fastening arrangement 50 is included on the bushing 36 for securing the bushing 36 to a second surface 52 of the block wall 22.

Referring to FIG. 3, the mounting arrangement 46 includes a peripheral flange 54 extending from the sidewalls 26 of the electrical box 24, apertures 56 in the peripheral flange 54, and box fasteners 58 for securing through the apertures 56 in the peripheral flange 54 and into the first surface 48.

With reference to FIG. 5, the fastening arrangement 50 includes an aperture 60 in the flange 38 of the bushing 36 and a fastener 62 for securing through the aperture 60 in the flange 38 and into the second surface 52.

Figure 4:
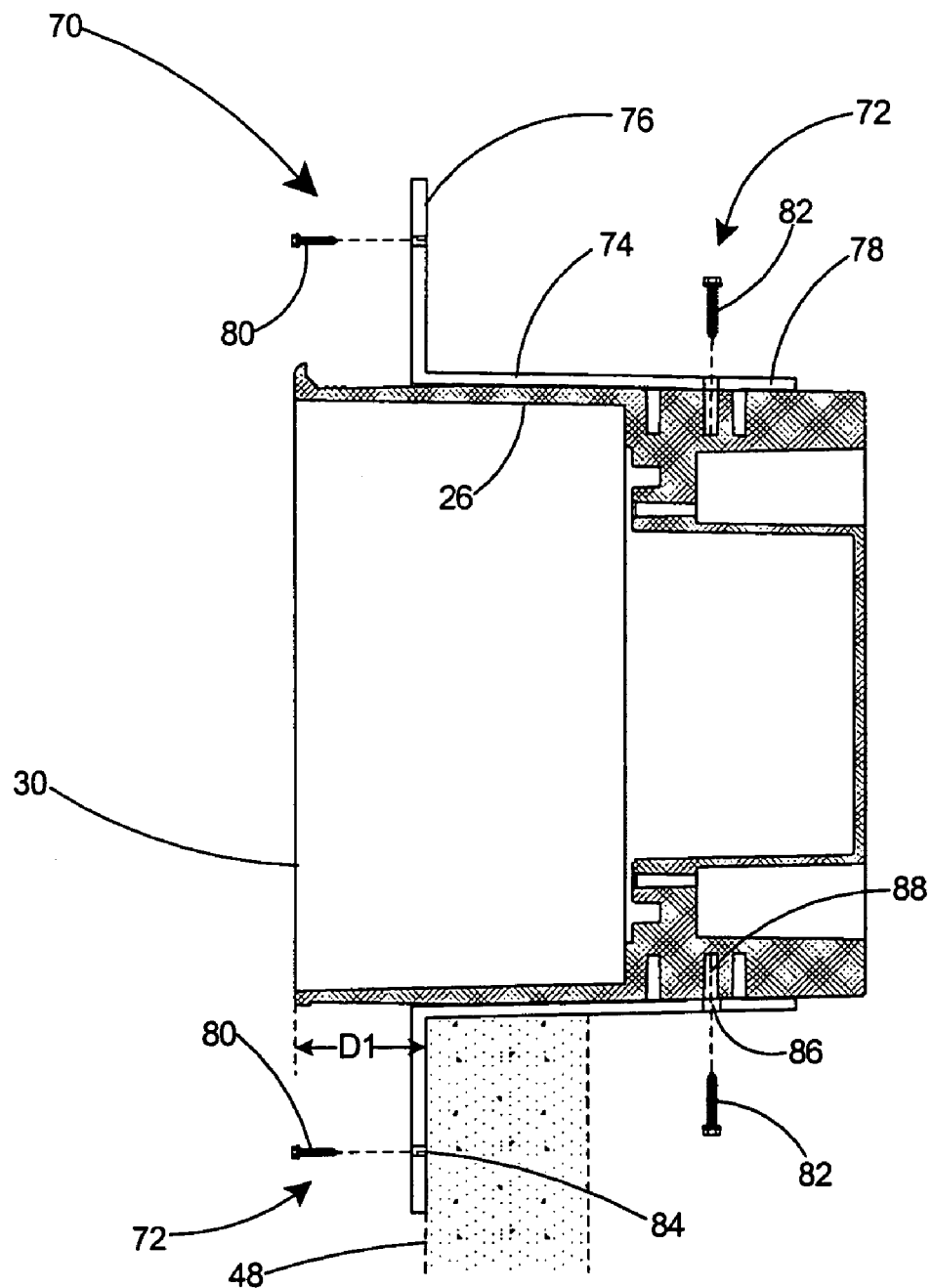
FIG. 4 is a sectional view of a second embodiment of an electrical box that forms a portion of an electrical box and cable bushing combination according to the present invention.

Referring to FIG. 4, a second and preferred embodiment of an electrical box 70 is shown which can form the electrical box portion of the electrical service combination of the present invention. The mounting arrangement 72 of electrical box 70 includes a slide member 74 having a peripheral flange 76, arms 78 extending from the peripheral flange 76, first fasteners 80 for securing through the peripheral flange 76 of the slide member 74 into the first surface 48, and second fasteners 82 for securing through the arms 78 and into the sidewalls 26 of the box. The mounting arrangement 72 further includes first apertures 84 in the peripheral flange 76, and second apertures 86 in the arms 78. The mounting arrangement further 72 includes the first fasteners 80 for securing through the first apertures 84 in the peripheral flange 76 into the first surface 48 and the second fasteners 82 for securing through the second apertures 86 in the arms 78 and into apertures 88 in the sidewalls 26 of the electrical box 70. Use of the second embodiment of the electrical box 70 shown herein enables an installer to select a desired offset (see D1 in FIG. 4) of the front edge 30 of the electrical box 70 from the first surface 48.

With reference to FIGS. 5–8, the flange portion 38 of the bushing 36 further includes a front surface 90 and an integral tab 92 extending from the front surface 90. The purpose of the tab 92 is to protect the surface of any electrical cables 94 later inserted through the tube portion 42 of the bushing 36 from abrasion by the fastener 62 inserted through aperture 60 in flange 38. The tab 92 preferably extends a distance between 0.15 and 0.50 inch (see D2 in FIG. 8) from the front surface of said flange, which is a sufficient distance to prevent the installed cable from contacting the fastener 62.

Referring to FIGS. 5 and 6, several dimensions of the bushing 36 are critical in order to achieve desired results in providing the combination of the present invention. As shown in FIG. 6, it is critical that the tube portion 42 extend a sufficient distance from the rear surface 40 of the flange 38 (see D3 in FIG. 6) in order to protect an inserted cable 94 for the entire thickness of the block 96. The tube portion 42 therefore preferably extends between 2.0 and 4.0 inches from the rear surface 40 of the flange 38 to provide adequate protection to the cable 94 thereby preventing abrasion of the cable. As shown in FIG. 5, it is furthermore preferable that the flange 38 of the bushing 36 extend outwards from the opening 44 far enough to cover the hole 98 formed in the block 96 (see D4 in FIG. 5). The flange 38 therefore preferably extends between 0.20 and 2.0 inches from the opening in the flange. For larger holes, as shown in FIG. 1, a washer 100 is placed between the second surface 52 and the rear surface 40 of the flange 38 to cover the hole 98.

Figure 9:
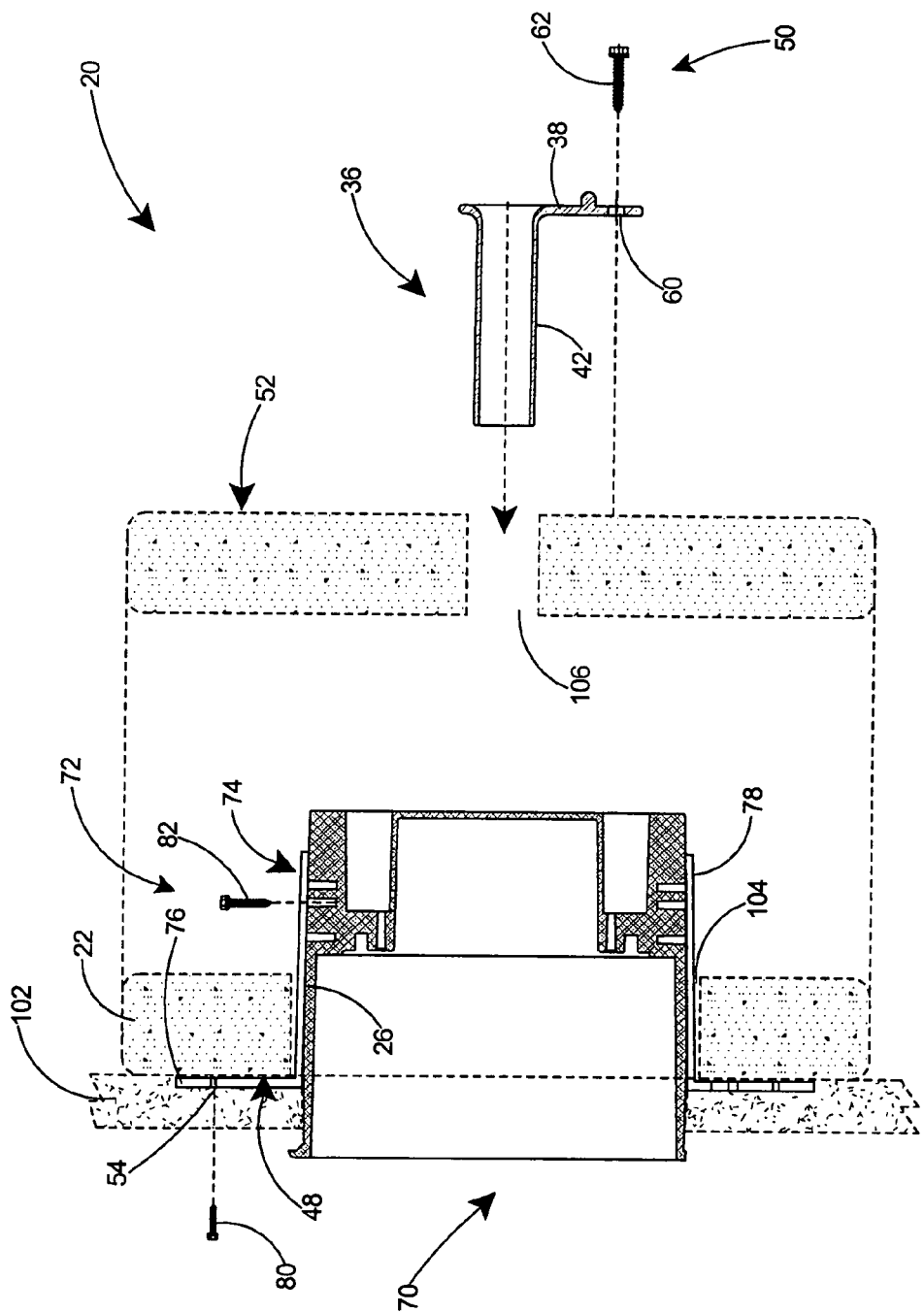
FIG. 9 is a sectional view of the combination of the present invention including the electrical box of FIG. 4 installed in the front wall of a block and with a cable bushing exploded away from and ready to be installed in the rear wall of the block.

With reference to FIG. 9, provision of the second embodiment of the electrical box 70 and bushing 36 enables an installer to provide the combination 20 of the present invention for providing electrical service on a block wall. The second embodiment of the electrical box 70 herein includes a mounting arrangement 72 having a peripheral flange 76 extending from the sidewalls 26 of the electrical box 70, apertures 56 in the peripheral flange 76, and a first fastener 80 for securing through the apertures 56 in the peripheral flange 76 into the first surface 48 of the block wall 22. An electrical box such as this has been described in U.S. application Ser. No. 11/120,707, which has been incorporated herein by reference, and, as described in that reference, slide member 74 is preferably secured to the sidewalls 26 of electrical box 70 by second fasteners 82 prior to installation on the wall 22. The location of the slide member 74 with respect to the sidewalls 26 determines the amount of offset the electrical box 70 will have from the first surface 48.

With reference to FIG. 9, it should be noted that a stucco layer 102 is depicted covering the first surface 48 of the block wall 22, the peripheral flange 54 of the electrical box 70, and a portion of the sidewalls 26 of the electrical box. Although shown in the figure, it should be understood that the stucco layer 102 is applied at the end of the installation procedure of the electrical box 70, and the first surface 48 of the block wall 22 is therefore accessible and visible during installation of the electrical box 70.

To operate the invention, an installer makes a first hole 104 in the first surface 48 of the block wall 22, the first hole 104 preferably larger than the sidewalls 26 of the electrical box 70. The installer then secures the electrical box 70 to the first surface 48 of the block wall 22 with the mounting arrangement 72. The installer then makes a second hole 106 in the second surface 52 of the block wall 22, the second hole 106 preferably larger than the tube portion 42 of the bushing 36. The installation is completed by securing the bushing 36 to the second surface 52 of the block wall 22 with the fastening arrangement 50, which includes driving a fastener 62 through the aperture 60 of the flange 38 and into the second surface 52.

With reference to FIG. 1, operation of the invention using the first embodiment of the electrical box 24 is analogous to that described above for the second embodiment of the electrical box with the exception that the first embodiment of the electrical box 24 includes a peripheral flange 54 that is integral with the sidewalls 26 of the electrical box 24, and therefore when secured to the block wall 22, the front edge 30 of the electrical box 24 is at a fixed offset with respect to the first surface 48 of the block wall 22.

As shown in FIG. 3, the electrical box 24 further includes a cover member 108 rotatably attached thereto, openings 110 in the peripheral flange 54 to facilitate the adherence of stucco when later applied thereto, removable sections 112 on the sidewalls 26, and U-shaped slots 114 within the sidewalls 26 at the front edge 30.

Referring to FIG. 6, the outer surface 116 of the tubular portion 42 is smooth and includes a substantially constant diameter throughout its length. With reference to FIG. 7, as the hole 98 formed in the block 96 is typically oversized, the tubular portion 42 is adapted to fit loosely within the hole 98 and is held within the hole by the fastening arrangement 50. Thus the bushing 36 can be easily pushed into the hole 98 without the use of a tool.

Having thus described the invention with reference to a preferred embodiment, it is to be understood that the invention is not so limited by the description herein but is defined as follows by the appended claims.

What is claimed is:

1. A combination for providing electrical service on a block wall comprising:
    an electrical box including sidewalls, a front edge, a front opening, and a cavity for receiving an electrical device therein;
    a peripheral flange extending from said sidewalls and offset from said front edge of said electrical box, said peripheral flange recessing said electrical device substantially behind an outer surface of said block wall;
    a bushing including a flange having a rear surface, a front surface, an integral tab extending from said front surface, a tube portion extending from said rear surface, and an opening extending through said flange and said tube portion;
    a mounting arrangement on said electrical box for securing said electrical box to said front surface of said block wall such that said peripheral flange of said electrical box is in contact with said outer surface of said block wall; and
    a fastening arrangement on said bushing for securing said bushing to a second surface of said block wall.

2. The combination of claim 1 wherein said mounting arrangement includes
    apertures in said peripheral flange; and
    fasteners for securing through said apertures in said peripheral flange into said outer surface of said block wall.

3. The combination of claim 1 wherein said fastening arrangement includes an aperture in said flange of said bushing; and
    a fastener for securing through said aperture in said flange into said second surface of said block wall.

4. The combination of claim 1 wherein said tab extends between 0.15 and 0.50 inch from said front surface of said flange.

5. The combination of claim 1 wherein said tube portion extends between 2.0 and 4.0 inches from said rear surface of said flange.

6. The combination of claim 1 wherein said electrical box includes a cover member hinged to and pivotable with respect to said sidewalls of said electrical box.

7. The combination of claim 2 wherein said peripheral flange of said electrical box includes openings therein for improved adherence of stucco when applied thereto.

8. The combination of claim 1 wherein said sidewalls of said electrical box include one or more U-shaped slots at a front edge of said sidewalls for passage of electrical cables therethrough.

* * * * *